United States Patent
Suzuki et al.

(10) Patent No.: US 8,215,699 B2
(45) Date of Patent: Jul. 10, 2012

(54) MOUNTING STRUCTURE OF SIDE-IMPACT-RESISTANT RESIN-MADE SHOCK ABSORBING MEMBER

(75) Inventors: Toshihiro Suzuki, Gamagori (JP); Yohei Migaki, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 161 days.

(21) Appl. No.: 12/756,234

(22) Filed: Apr. 8, 2010

(65) Prior Publication Data

US 2010/0259069 A1 Oct. 14, 2010

(30) Foreign Application Priority Data

Apr. 14, 2009 (JP) .................................. 2009-97984
Mar. 3, 2010 (JP) ................................ 2010-046900

(51) Int. Cl.
*B60J 5/00* (2006.01)
(52) U.S. Cl. .............. 296/146.7; 296/146.6; 296/187.12
(58) Field of Classification Search ............... 296/146.6, 296/146.7, 187.05, 187.12, 191
See application file for complete search history.

(56) References Cited

U.S. PATENT DOCUMENTS

| | | | |
|---|---|---|---|
| 5,806,899 A | 9/1998 | Norikawa et al. | |
| 5,857,702 A | 1/1999 | Suga et al. | |
| 5,925,435 A * | 7/1999 | Togawa et al. | 428/120 |
| 6,203,096 B1 | 3/2001 | Noda et al. | |
| 6,520,568 B2 | 2/2003 | Von Holst et al. | |
| 7,997,637 B2 * | 8/2011 | Suzuki et al. | 296/146.7 |
| 2009/0250966 A1 | 10/2009 | Suzuki et al. | |
| 2010/0007171 A1 | 1/2010 | Tomasu | |

FOREIGN PATENT DOCUMENTS

| | | |
|---|---|---|
| JP | 08-142234 | 6/1996 |
| JP | 09-207576 | 8/1997 |
| JP | 11-334506 | 12/1999 |
| JP | 2007-055549 | 3/2007 |
| WO | WO 2009019938 A1 * | 2/2009 |

* cited by examiner

*Primary Examiner* — Dennis Pedder
*Assistant Examiner* — Jason S Daniels
(74) *Attorney, Agent, or Firm* — Greenblum & Bernstein, P.L.C.

(57) ABSTRACT

A mounting structure between a door trim and a door panel is provided and includes at least a shock absorbing member and movement restricting members. The shock absorbing member includes a cross-shaped rib including four ribs coupled into a cross shape and arranged perpendicular to the door trim, an outer wall portion coupled to a side edge of at least one of the ribs and has a contact edge in contact with the door trim, and a mounting bearing projecting from the contact edge along the door trim and configured to be fixed to the door trim together with the cross-shaped rib and the outer wall portion. The movement restricting members restrict the ribs from moving relative to the door trim at side impact.

15 Claims, 13 Drawing Sheets

MOUNTING STRUCTURE OF SIDE-IMPACT-RESISTANT RESIN-MADE SHOCK ABSORBING MEMBER

CROSS REFERENCE TO RELATED APPLICATION

This application claims priority from Japanese Patent Application No. 2009-97984 filed on Apr. 14, 2009 and Japanese Patent Application No. 2010-46900 filed on Mar. 3, 2010. The entire content of these priority applications is incorporated herein by reference.

TECHNICAL FIELD

The present invention relates to a mounting structure of a side-impact-resistant resin-made shock absorbing member provided between a door trim and a door panel for use in a vehicle and mounted on the door trim.

BACKGROUND

Various side-impact-resistant resin-made shock absorbing members have been known. For example, Japanese Patent Laid-Open No. 8-142234 discloses a lattice-shaped side-impact-resistant resin-made shock absorbing member. The side-impact-resistant resin-made shock absorbing member is configured to have a bottom plate attached to an outer compartment side surface of the door trim and a plurality of lattice-shaped ribs rising from the bottom plate. In addition, Japanese Patent Laid-Open No. 2007-55549 discloses a box-shaped side-impact-resistant resin-made shock absorbing member. The side-impact-resistant resin-made shock absorbing member has rectangular tubular ribs rising from an outer compartment side surface of the door trim. The above shock absorbing members are configured to be able to absorb impact by buckling the ribs at side impact.

Unfortunately, the configurations disclosed in Japanese Patent Laid-Open No. 8-142234 and Japanese Patent Laid-Open No. 2007-55549 are difficult to exhibit good energy absorbing characteristics, for example, as illustrated by a structure in FIG. 13, in which if a mounting surface 3 of a resin-made shock absorbing member 2 is inclined vertically, the front of a rib 4 slides on the mounting surface 3 of the door trim 1 and collapses as is without the rib 4 being buckled. Additionally, if an input load direction 5 at side impact is inclined horizontally, the front of the rib 4 slides and collapses as is without the rib 4 being buckled, and thus it is difficult to exhibit good energy absorbing characteristics.

SUMMARY

In view of the above circumstances, the present invention has been completed, and an object of the present invention is to provide a mounting structure of a side-impact-resistant resin-made shock absorbing member capable of exhibiting good energy absorbing characteristics at side impact by preventing ribs from being collapsed.

The present invention provides a mounting structure of a side-impact-resistant resin-made shock absorbing member provided between a door trim and a door panel for use in a vehicle and mounted on the door trim, wherein the resin-made shock absorbing member comprises: a cross-shaped rib formed by coupling four ribs into a cross shape at a crossed position with the door trim, and the cross-shaped rib having a side edge and a coupling portion on respective opposite ends of each of the ribs, and the coupling portion is formed by coupling the ribs; an outer wall portion that is coupled into a T-shape to the side edge and has a contact edge contactable to the door trim; and a mounting bearing surface that is provided along the door trim from the contact edge of the outer wall portion and mounts and fixes the cross-shaped rib to the door trim via the outer wall portion, and wherein the door trim has a movement restricting portion that restricts the ribs from moving relative to the door trim at side impact.

According to the above configuration, the movement restricting portion can restrict the ribs from moving relative to the door trim, and thus can surely buckle each rib. Therefore, the above configuration can exhibit good energy absorbing characteristics at side impact.

DETAILED DESCRIPTION OF THE PREFERRED ILLUSTRATIVE ASPECTS

<First illustrative aspect>

Figure 1:
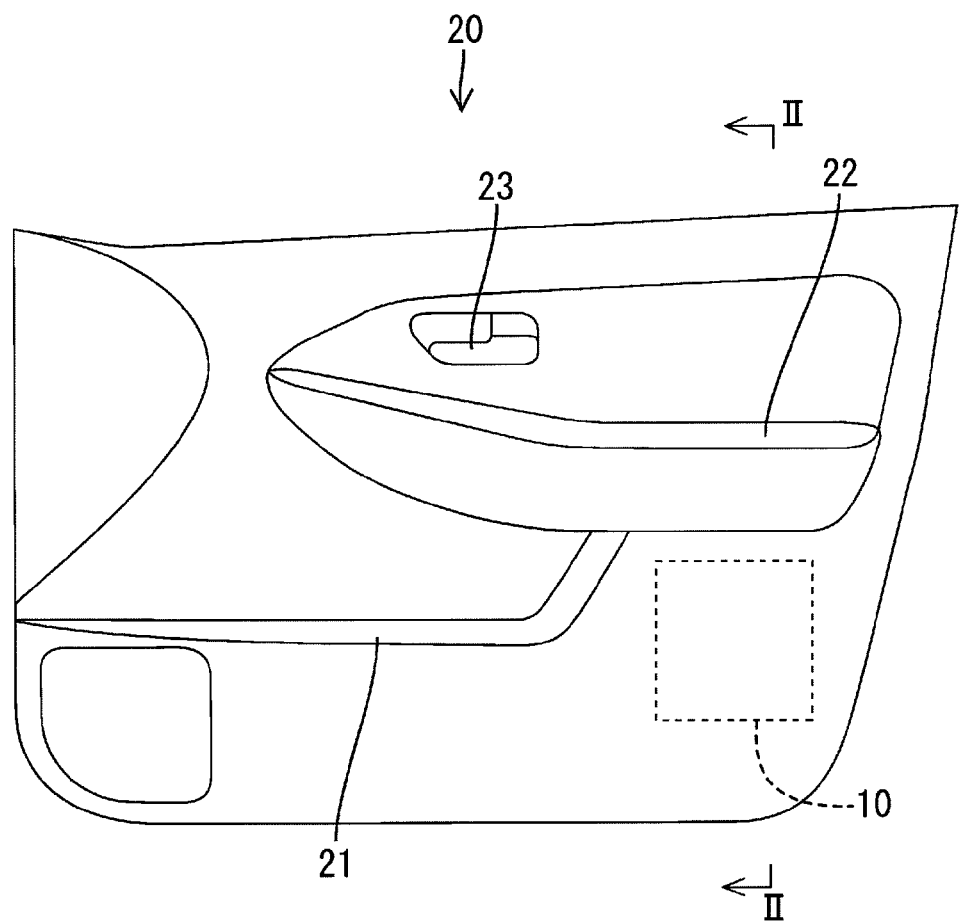
FIG. 1 is a front view of a door trim according to a first illustrative aspect.
Figure 2:
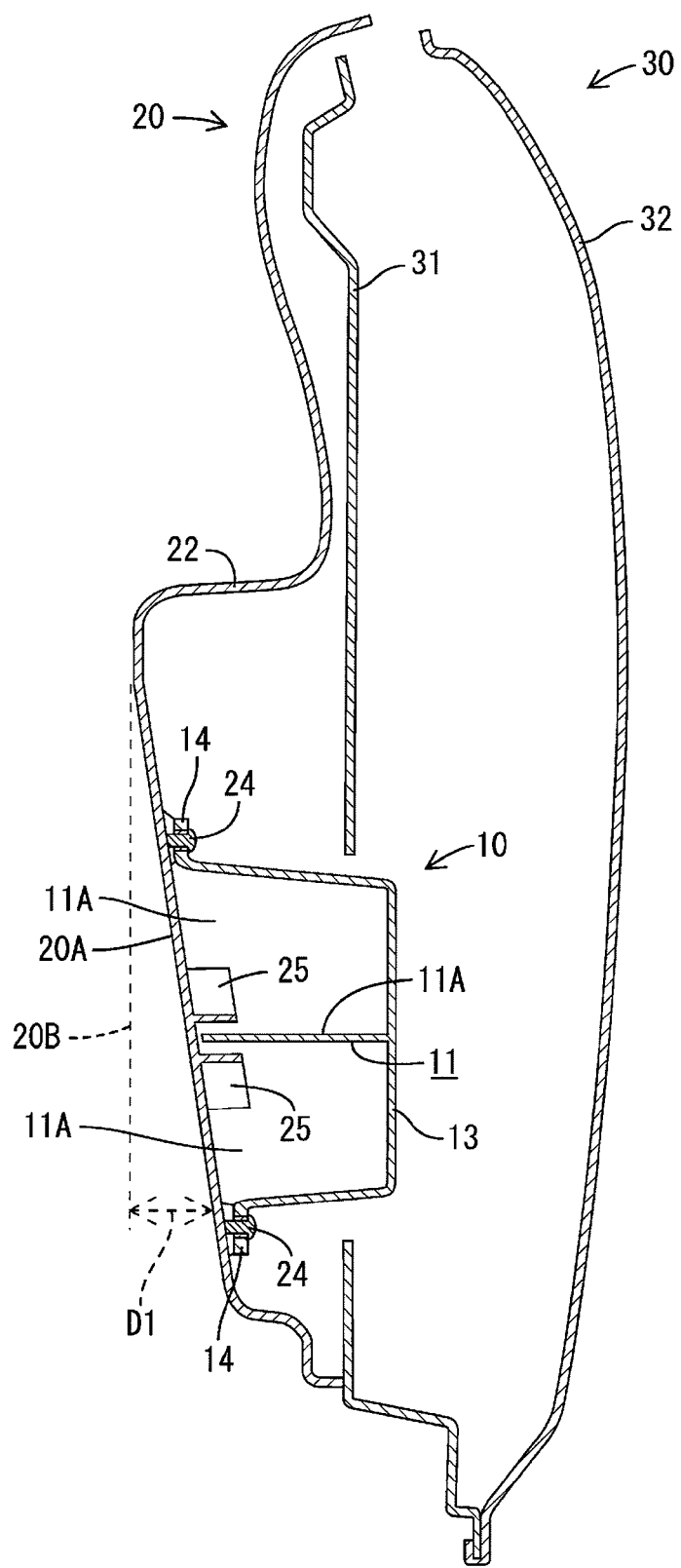
FIG. 2 is a cross-sectional view along line II-II of FIG. 1.

By referring to FIGS. 1 to 8, a first illustrative aspect of the present invention will be described. As illustrated in FIG. 1, a door trim 20 of the present illustrative aspect is configured to include a door pocket 21, an armrest 22, an inside handle 23, and the like. As illustrated in FIG. 2, the door trim 20 is fixed to an inner compartment side of the door panel 30. The door panel 30 includes an inner panel 31 provided on an inner compartment side and an outer panel 32 provided on an outer compartment side.

The resin-made shock absorbing member 10 is a "side-impact-resistant resin-made shock absorbing member" according to the present invention and is installed on an outer compartment side surface of the door trim 20. The outer compartment side surface of the door trim 20 refers to a surface on a side facing the inner panel 31 of the outer and inner surfaces of the door trim 20. The inner compartment side surface of the door trim 20 refers to a design surface facing a compartment space of the outer and inner surfaces of the door trim 20. Note that the outer compartment side surface of the door trim 20 is hereinafter referred to simply as "the outer surface of the door trim 20", and the inner compartment side surface of the door trim 20 is hereinafter referred to simply as "the inner surface of the door trim 20".

The resin-made shock absorbing member 10 is provided corresponding to near a lumbar portion of an occupant seating on a seat (not illustrated) in the door trim 20. The resin-made shock absorbing member 10 faces the door panel 30. Therefore, when an impact is applied from a lateral direction of the vehicle at side impact, the door panel 30 is deformed toward the inner compartment side and contacts the resin-made shock absorbing member 10. Note that the resin-made shock absorbing member 10 is made of polypropylene resin and the like.

Figure 3:
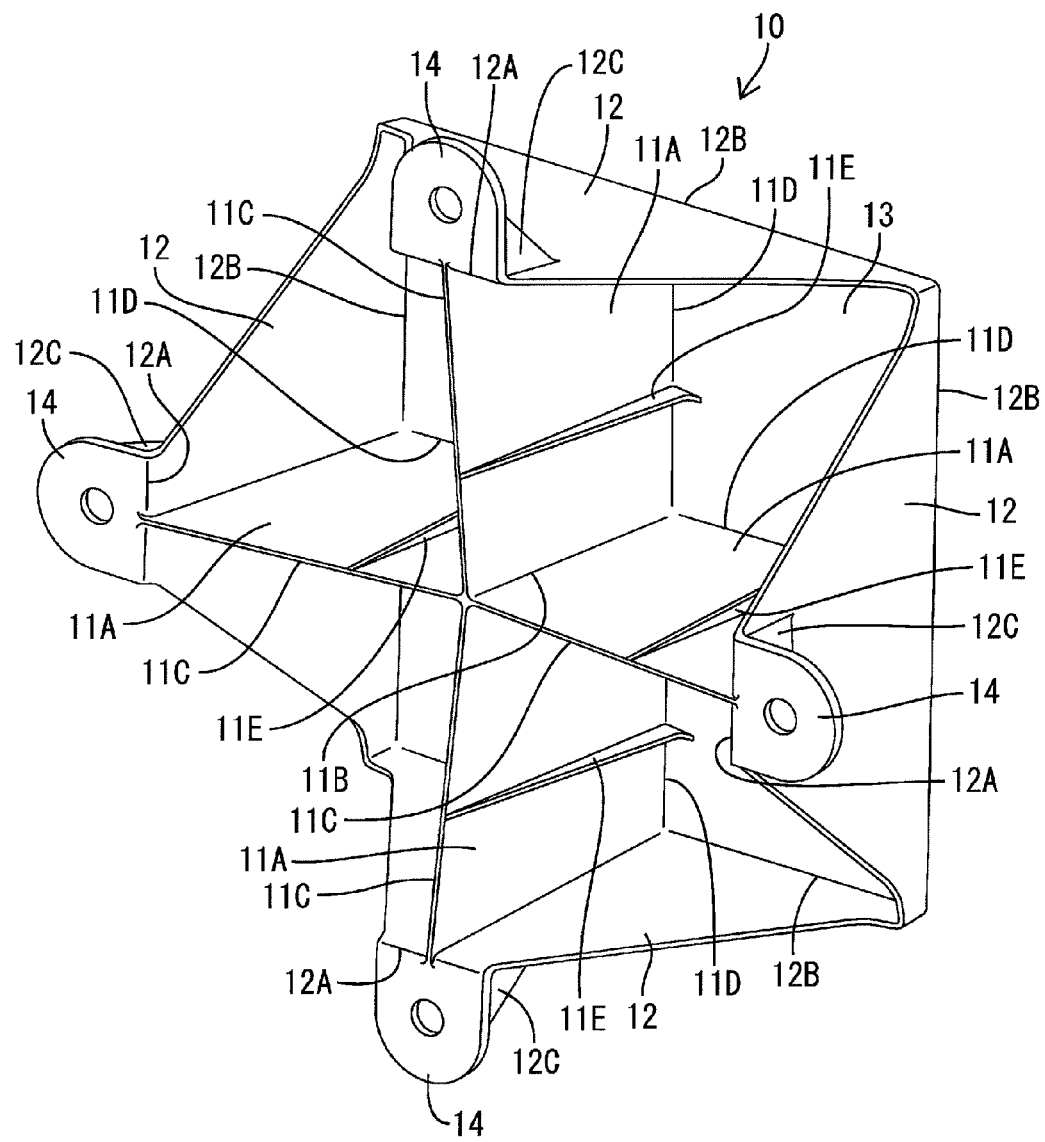
FIG. 3 is a perspective view of a resin-made shock absorbing member viewed from the door trim side of FIG. 1.

As illustrated in FIG. 3, the resin-made shock absorbing member 10 includes a cross-shaped rib 11, four outer wall portions 12, a top plate 13, four mounting bearing surfaces 14, and the like.

The cross-shaped rib 11 has four ribs 11A provided being crossed on an outer surface of the door trim 20. Each rib 11A is coupled to each other at a coupling portion 11B located at the center of the cross-shaped rib 11 and is configured to extend radially at an equal angle (90°) interval from the coupling portion 11B. Such a simple configuration using the cross-shaped rib 11 enables an easy die cutting at molding in comparison with a lattice-shaped resin-made shock absorbing member 10.

The outer wall portion 12 is coupled into a T-shape to a side edge facing a coupling portion 11B of each rib 11A and has a contact edge 12A contactable to an outer surface of the door trim 20. The outer wall portion 12 is formed gradually narrower in width from an edge 12B of the outer compartment side (a side facing the door panel 30) toward the contact edge 12A. In other words, the resin-made shock absorbing member 10 of the present illustrative aspect is formed by obliquely cutting a part of each corner of the lattice-shaped resin-made shock absorbing member 10. Thereby, the resin-made shock absorbing member 10 can be made light-weight as well as an initial load to be applied to an occupant at side impact can gradually rise by reducing the rigidity of the outer wall portion 12.

The contact edge 12A of the outer wall portion 12 has a mounting bearing surface 14 which extends outwardly along an outer surface of the door trim 20 from the contact edge 12A. The mounting bearing surface 14 has a mounting hole. A resin boss 24 integrally formed with the door trim 20 is inserted into the mounting hole, and then the resin boss 24 is welded by welding technique such as ultrasonic welding. Thereby, the resin-made shock absorbing member 10 is mounted and fixed to the door trim 20. Note that not only welding technique such as ultrasonic welding but also fixing technique such as screw tightening and claw fitting may be used.

A coupling rib 12C is provided between the outer wall portion 12 and the mounting bearing surface 14 to couple them. The coupling rib 12C restricts the outer wall portion 12 from collapsing toward the mounting bearing surface 14 side. Therefore, the coupling rib 12C can restrict both the outer wall portion 12 and the rib 11A from simultaneously collapsing at side impact. Further, the coupling rib 12C can prevent the outer wall portion 12 from being broken.

A top plate 13 is coupled to an edge 11D on an outer compartment side of the cross-shaped rib 11. As illustrated in FIG. 2, the top plate 13 is provided facing the outer panel 32. The top plate 13 is substantially square shaped and each of the four sides thereof is coupled to the edge 12B of the outer wall portion 12. Thereby, the top plate 13 can surely transmit the impact received at side impact to the cross-shaped rib 11. That is, any impact received anywhere as long as the impact is received within the range where the top plate 13 is installed can be transmitted to the cross-shaped rib 11.

As illustrated in FIG. 2, a rib 11A has a mutually facing edge 11C facing the door trim 20 and having a shape in contact with or spaced by a constant distance to an outer surface of the door trim 20. Therefore, when the resin-made shock absorbing member 10 receives an impact, the impact is transmitted to the cross-shaped rib 11 via the top plate 13. When the entire cross-shaped rib 11 is deformed, an initial load occurs. When the entire mutually facing edge 11C contacts the door trim 20 and the ribs 11A are buckled, a final load occurs.

Each of the both side surfaces of a rib 11A has a reinforcing rib 11E for reinforcing the rib 11A. The reinforcing rib 11E can prevent the rib 11A from being broken at side impact. The reinforcing rib 11E is formed gradually smaller toward the mutually facing edge 11C side from the edge 11D side of the rib 11A. Thereby, on the mutually facing edge 11C side of the rib 11A, the buckling operation of the rib 11A is not inhibited, and on the edge 11D side of the rib 11A, the rib 11A can be prevented from collapsing.

Meanwhile, in the door trim 20, as illustrated in FIG. 2, a mounting surface 20A on which the resin-made shock absorbing member 10 is mounted is inclined downward in a direction toward the outer compartment side. More specifically, on the lower end of the resin-made shock absorbing member 10, the mounting surface 20A is provided on an outer compartment side spaced by a distance D1 from a mounting surface 20B (dotted line portion) when the resin-made shock absorbing member 10 is vertically mounted. In contrast to this, the cross-shaped rib 11 is formed horizontally, and thus the cross-shaped rib 11 is provided in an oblique direction with respect to the mounting surface 20A. Consequently, if a later described collapse prevention rib 25 is not provided, when an impact is received, the rib 11A slides on the mounting surface 20A, and thus good impact absorbing characteristics cannot be exhibited (see FIG. 13).

Figure 6:
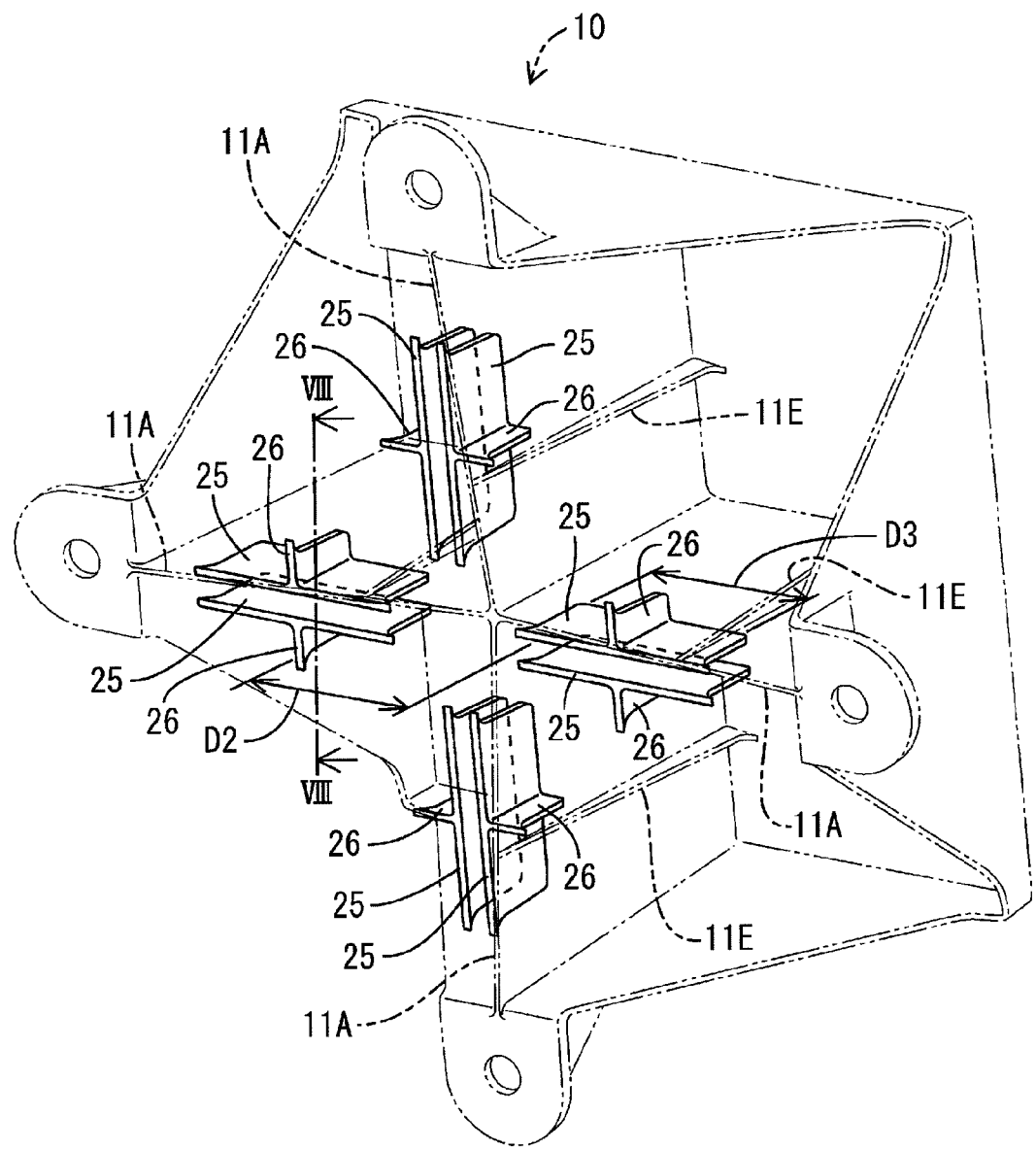
FIG. 6 is a perspective view illustrating a positional relationship between the resin-made shock absorbing member and collapse prevention ribs of FIG. 1.
Figure 7:
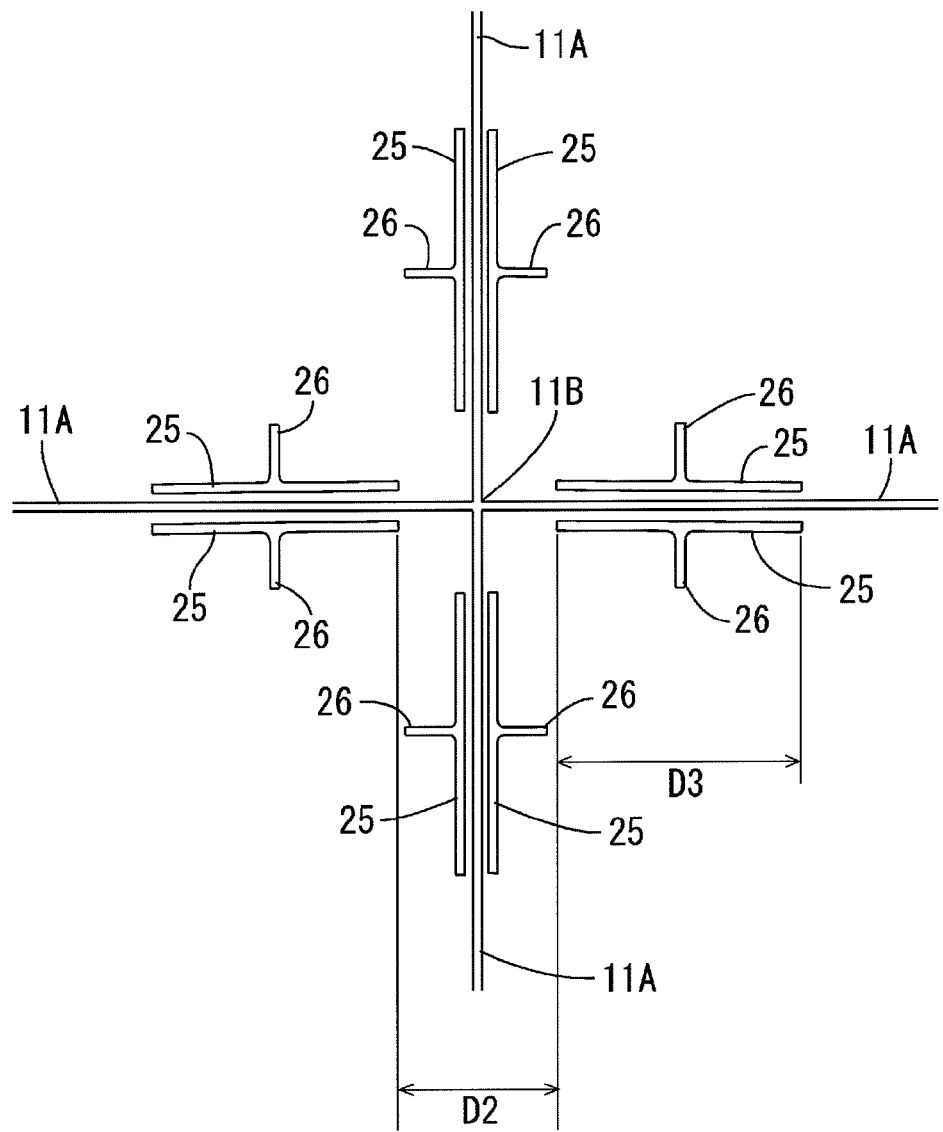
FIG. 7 is a simplified view illustrating the positional relationship between a cross-shaped rib and the collapse prevention ribs of the resin-made shock absorbing member viewed from the door trim side in FIG. 6.

In light of this, according to the present illustrative aspect, as illustrated in FIG. 6, a collapse prevention rib (an example of "a projecting portion" of the present invention) 25 is provided on both sides of each rib 11A. Thus, a total of eight collapse prevention ribs 25 restrict the ribs 11A from sliding. The collapse prevention rib 25 is integrally formed with the door trim 20 in a form projecting from an outer surface of the door trim 20 toward the outer compartment side. As illustrated in FIG. 7, the collapse prevention rib 25 extends parallel to an extending direction of the rib 11A. More specifically, a vertically extending collapse prevention rib 25 is provided on a vertically extending rib 11A, and a horizontally extending collapse prevention rib 25 is provided on a horizontally extending rib 11A.

Figure 8:
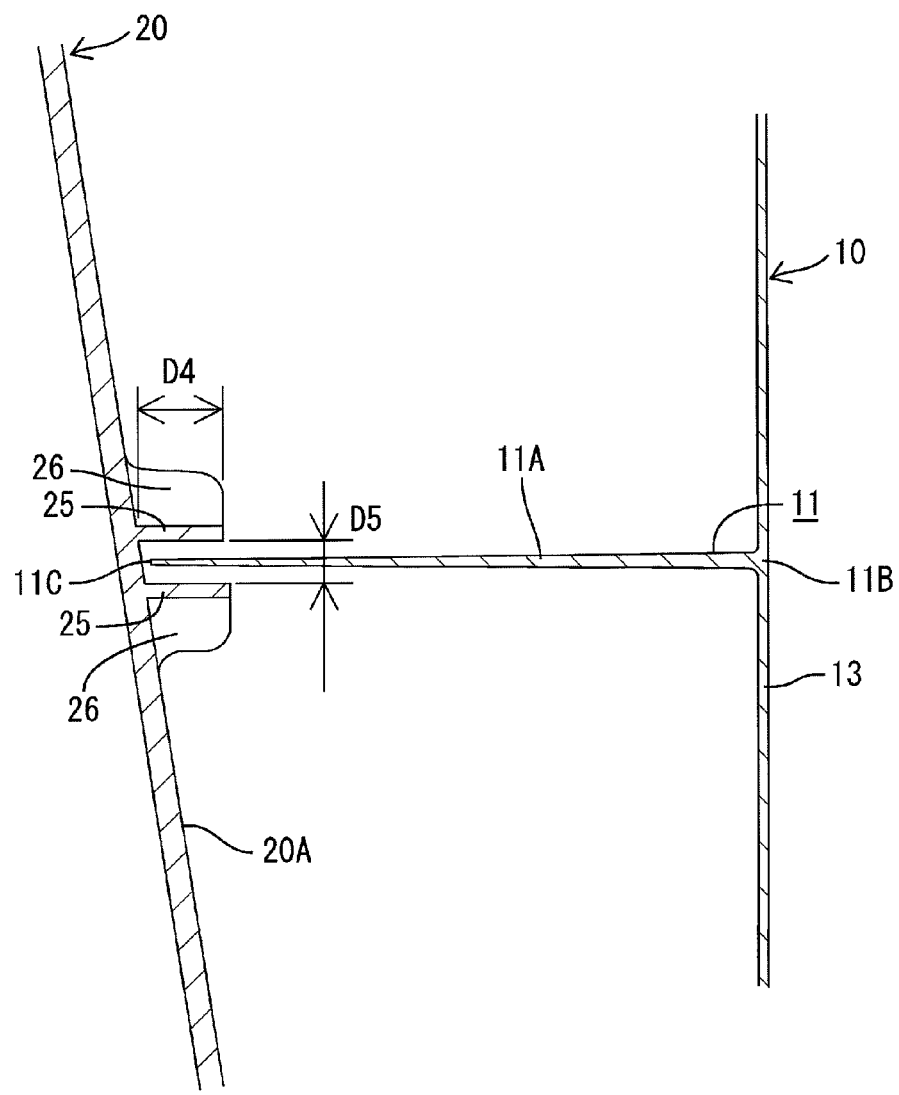
FIG. 8 is a cross-sectional view along line VIII-VIII of FIG. 6.

The collapse prevention rib 25 is preferably configured such that, as illustrated in FIG. 6, the length D3 extending along the mounting surface 20A of the door trim 20 is 40 mm or longer; and, as illustrated in FIG. 8, the height D4 in a direction crossed with the mounting surface 20A is 10 mm or longer. The above configuration can restrict the rib 11A from passing over the collapse prevention rib 25 at side impact. Moreover, the collapse prevention rib 25 is preferably configured such that the interval D5 between a pair of collapse prevention ribs 25 provided on both sides of a rib 11A is about 5 mm; and, as illustrated in FIG. 6, the interval D2 between the pair of collapse prevention ribs 25 provided on both sides of the center of the cross-shaped rib 11 is about 40 mm.

The collapse prevention rib 25 is configured such that a support rib 26 for preventing the collapse prevention rib 25 itself from collapsing is provided on each surface behind the collapse prevention rib 25 facing the rib 11A. The support rib 26 is orthogonally coupled to the collapse prevention rib 25 at the center thereof. Therefore, if the rib 11A slides to contact the collapse prevention rib 25 so as to act in a direction in which the collapse prevention rib 25 collapses, the support rib 26 prevents the collapse prevention rib 25 from collapsing. Thereby, as illustrated in FIG. 4, the rib 11A can be surely buckled.

Figure 5:
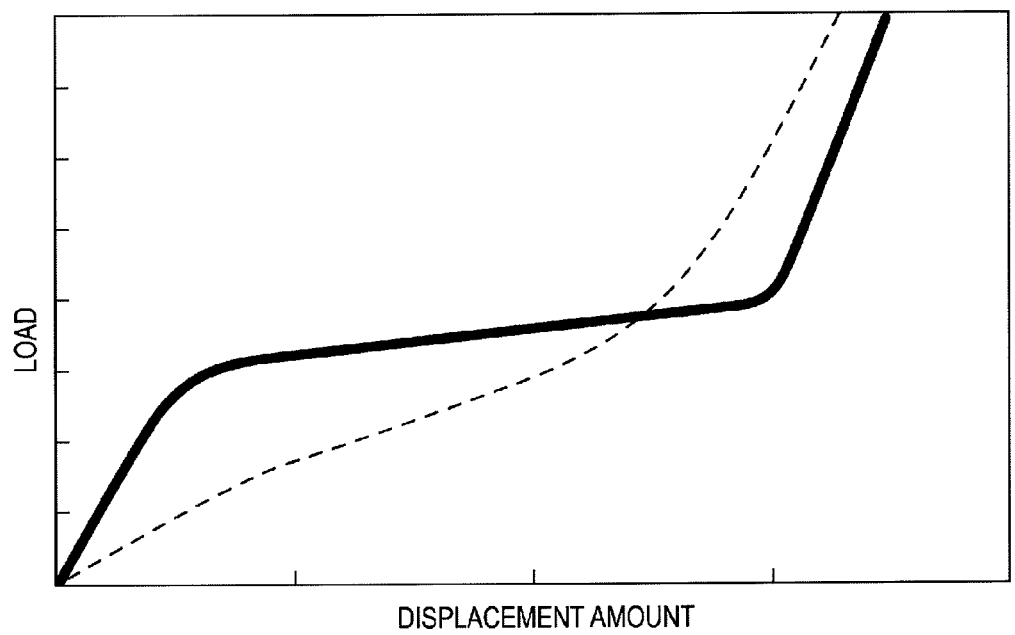
FIG. 5 is a graph illustrating energy absorbing characteristics of the resin-made shock absorbing member of FIG. 1.

Here, FIG. 5 is a graph of measurements of load received by an inner compartment side of the door trim 20 as the energy absorbing characteristics of the resin-made shock absorbing member 10 of the present illustrative aspect. The horizontal line of FIG. 5 indicates the amount of displacement of the resin-made shock absorbing member 10 pressed by the door panel 30. In FIG. 5, zero is set to a position where the door panel 30 contacts the resin-made shock absorbing member 10, and from here, the amount of displacement increases with the movement thereof into the inner compartment side. The vertical line of FIG. 5 indicates the load absorbed by the deformation of the resin-made shock absorbing member 10.

Figure 4:
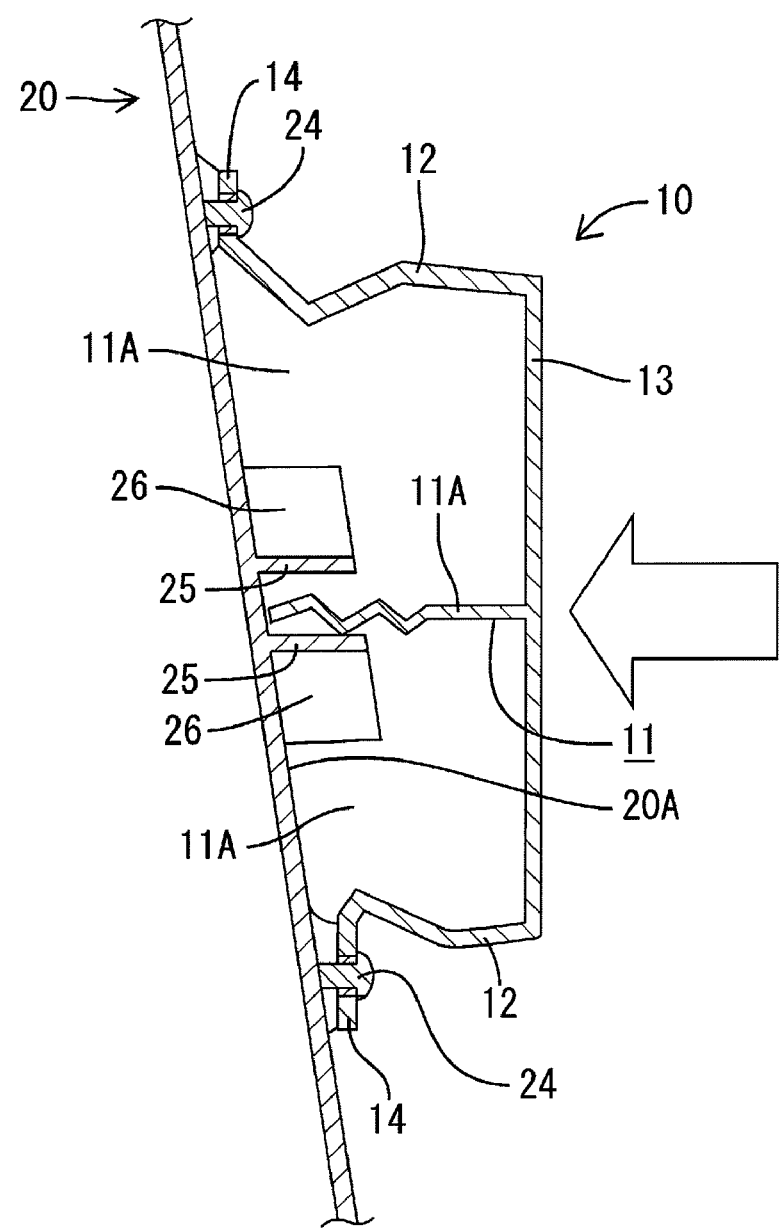
FIG. 4 is a cross-sectional view illustrating a buckled state of the resin-made shock absorbing member of FIG. 1.
Figure 13:
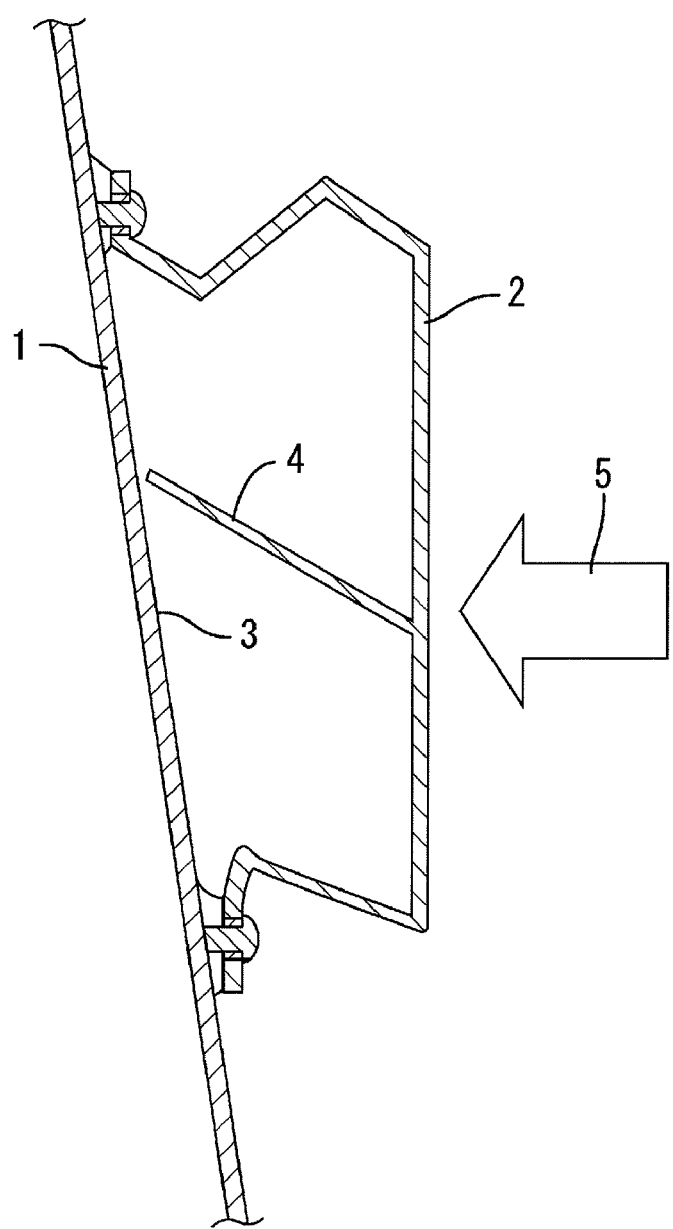
FIG. 13 is a cross-sectional view illustrating a buckled state of a conventional resin-made shock absorbing member.

The solid line of FIG. 5 indicates a deformation mode illustrated in FIG. 4; and the dotted line of FIG. 5 indicates a deformation mode illustrated in FIG. 13. It is understood from the deformation mode of FIG. 13 that the rib 11A collapses and the impact is not sufficiently absorbed; subsequently the rib 11A is not buckled and the deformation mode indicates an upward-sloping curve; and thus good energy absorbing characteristics cannot be exhibited. In contrast, it is confirmed from the deformation mode of FIG. 4 that the entire cross-shaped rib 11 flexes and the impact is sufficiently absorbed; the rib 11A is buckled to absorb substantially constant load; and thus good energy absorbing characteristics can be exhibited.

Hereinbefore, the structure of the present illustrative aspect has been described. Hereinafter, the operation thereof will be described. First, when a vehicle receives an impact from a lateral direction by side impact, the door panel 30 is deformed toward the inner compartment side. When the door panel 30 contacts the top plate 13 of the resin-made shock absorbing member 10, the impact from the door panel 30 is transmitted to the cross-shaped rib 11.

The rib 11A is coupled not only to the coupling portion 11B but also to the outer wall portion 12. Therefore, the rib 11A is restricted from collapsing without being buckled, and the entire cross-shaped rib 11 is deformed to absorb an impact from outside the compartment.

Then, the mutually facing edge 11C of the rib 11A attempts to move along the mounting surface 20A, but a pair of collapse prevention ribs 25 provided on both sides of the rib 11A restricts the rib 11A from collapsing. Therefore, the rib 11A starts to be normally buckled. Event at buckling, the behavior of the rib 11A is controlled by the outer wall portion 12 such that the rib 11A is buckled so as to be folded on itself toward the door trim 20 side. Consequently, ideal energy absorbing characteristics are exhibited while maintaining substantially constant load. Moreover, a simple configuration using the cross-shaped rib 11 allows the rib 11A to be formed high enough to secure a stroke for absorbing impact at buckling.

As described above, according to the present illustrative aspect, each pair of collapse prevention ribs 25 provided on both sides of the rib 11A can restrict the rib 11A from collapsing and can surely buckle the rib 11A regardless of the shape of the mounting surface 20A of the door trim 20 and the direction of an impact inputted from the outer panel 32.

<Second illustrative aspect>

Figure 9:
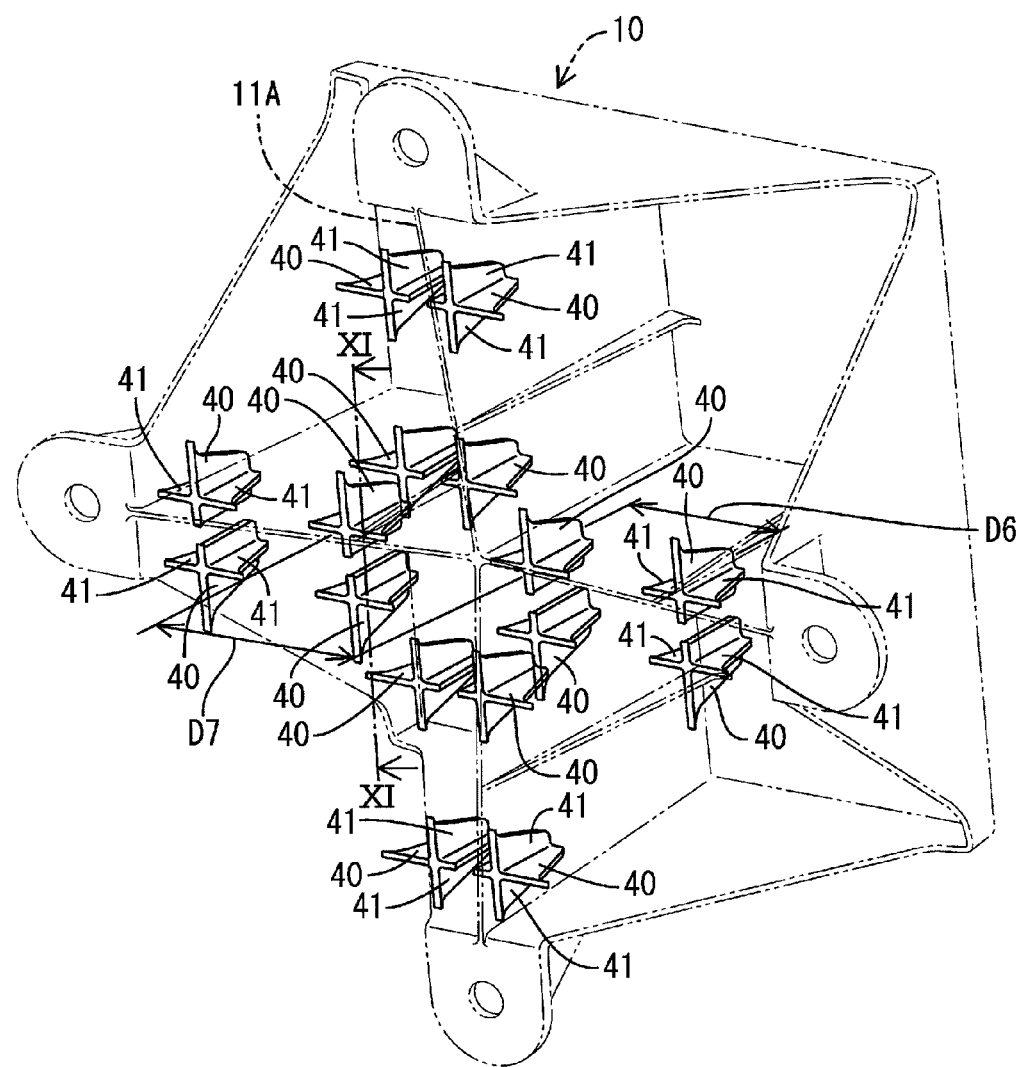
FIG. 9 is a perspective view illustrating a positional relationship between a resin-made shock absorbing member and collapse prevention ribs according to a second illustrative aspect.
Figure 10:
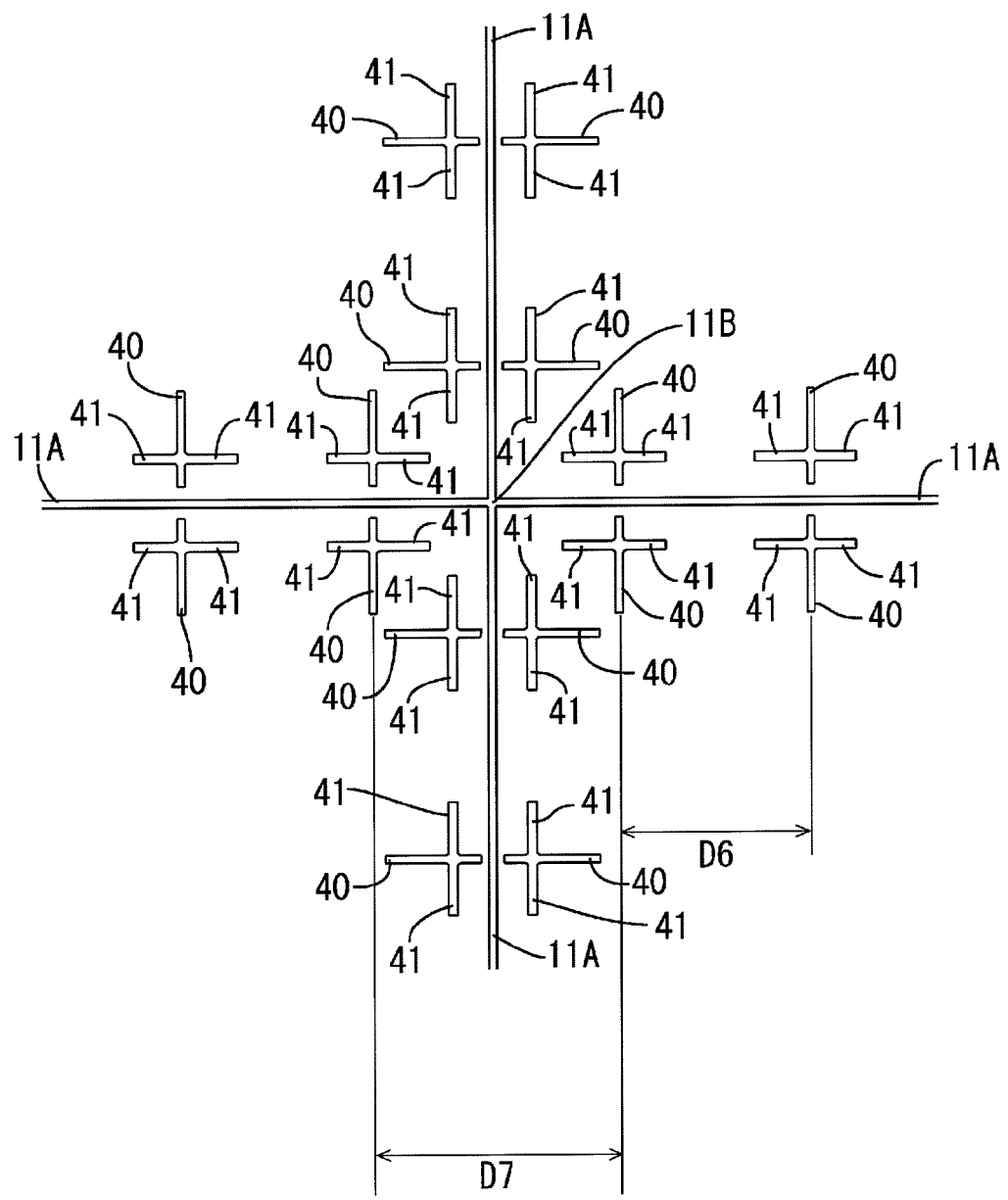
FIG. 10 is a simplified view illustrating the positional relationship between the cross-shaped rib and the collapse prevention ribs of the resin-made shock absorbing member viewed from the door trim side in FIG. 9.
Figure 11:
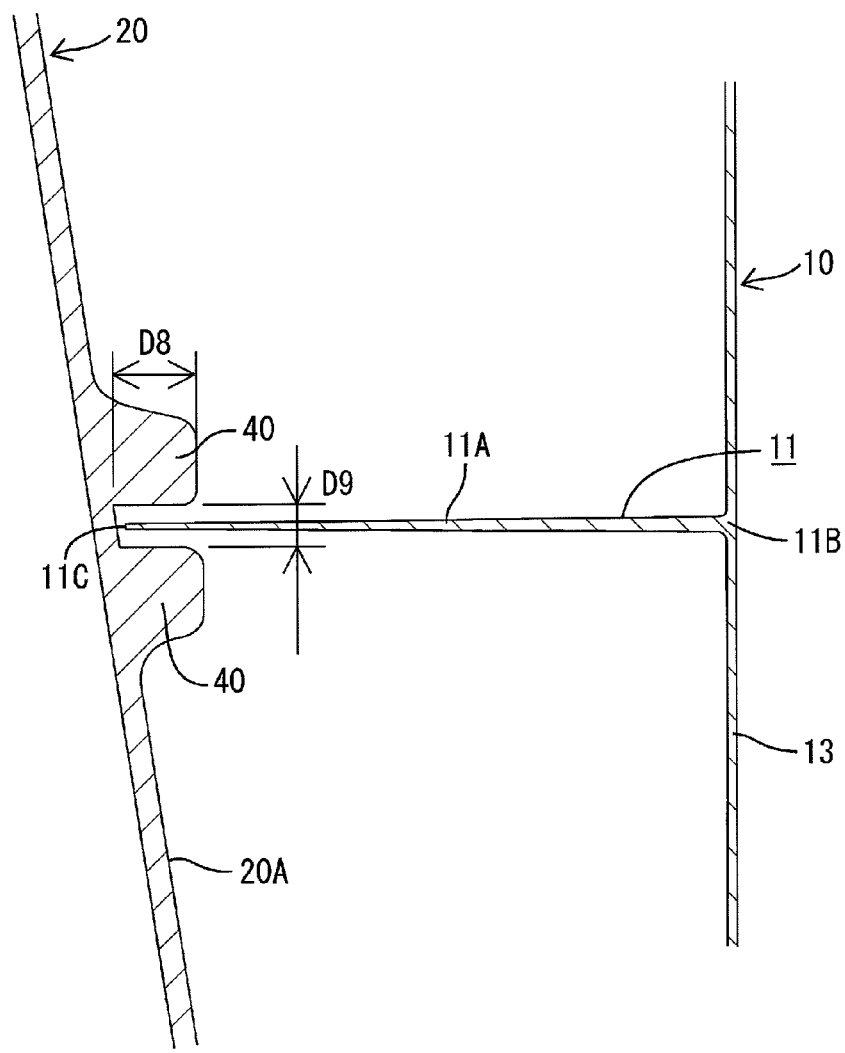
FIG. 11 is a cross-sectional view along line XI-XI of FIG. 9.

Hereinafter, by referring to FIGS. 9 to 11, the second illustrative aspect of the present invention will be described. Unlike the collapse prevention ribs 25 of the first illustrative aspect, the collapse prevention ribs 40 of the present illustrative aspect are formed so as to extend orthogonally to the rib 11A as illustrated in FIG. 9. The same configuration, operation, and effect as those of the first illustrative aspect are duplicate, and thus the duplicate description is omitted. Each pair of collapse prevention ribs 40 is provided on both sides of a rib 11A. More specifically, four collapse prevention ribs 40 are provided on one rib 11A. Each support rib 41 is provided on both sides of the collapse prevention ribs 40 so as to prevent the collapse prevention ribs 40 themselves from collapsing. Consequently, eight support ribs 41 are provided on one rib 11A.

As illustrated in FIG. 9, the collapse prevention ribs 40 are preferably configured such that the distance D6 between a pair of collapse prevention ribs 40 provided on the same side of one rib 11A is approximately 40 mm; and the distance D7 between the pair of collapse prevention ribs 40 provided on both sides of the center of the cross-shaped rib 11 is approximately 40 mm. Moreover, as illustrated in FIG. 11, the collapse prevention ribs 40 are preferably configured such that the height D8 in a crossed direction with the mounting surface 20A of the door trim 20 is 10 mm or higher; and the distance D9 between the pair of collapse prevention ribs 40 provided on both sides of one rib 11A is approximately 5 mm. The above configuration can restrict the rib 11A from passing over the collapse prevention ribs 40 at side impact.

According to the present illustrative aspect, when an attempt is made to mount the resin-made shock absorbing member 10 on a position outside a normal mounting position, the mutually facing edge 11C of the rib 11A interferes with the front of the collapse prevention ribs 40, and thus being in a position outside the normal mounting position can be detected. At this moment, the resin-made shock absorbing member 10 is not fit into between the pair of collapse prevention ribs 40, and thus can be moved freely. Then, when the resin-made shock absorbing member 10 reaches a normal mounting position, the rib 11A is fit into between the pair of collapse prevention ribs 40, and thus reaching the normal mounting position can be detected. Thus, the present illustrative aspect not only can have the same effect as that of the first illustrative aspect but also can improve the mounting performance for mounting the resin-made shock absorbing member 10 as well as can prevent erroneous mounting.

<Third illustrative aspect>

Figure 12:
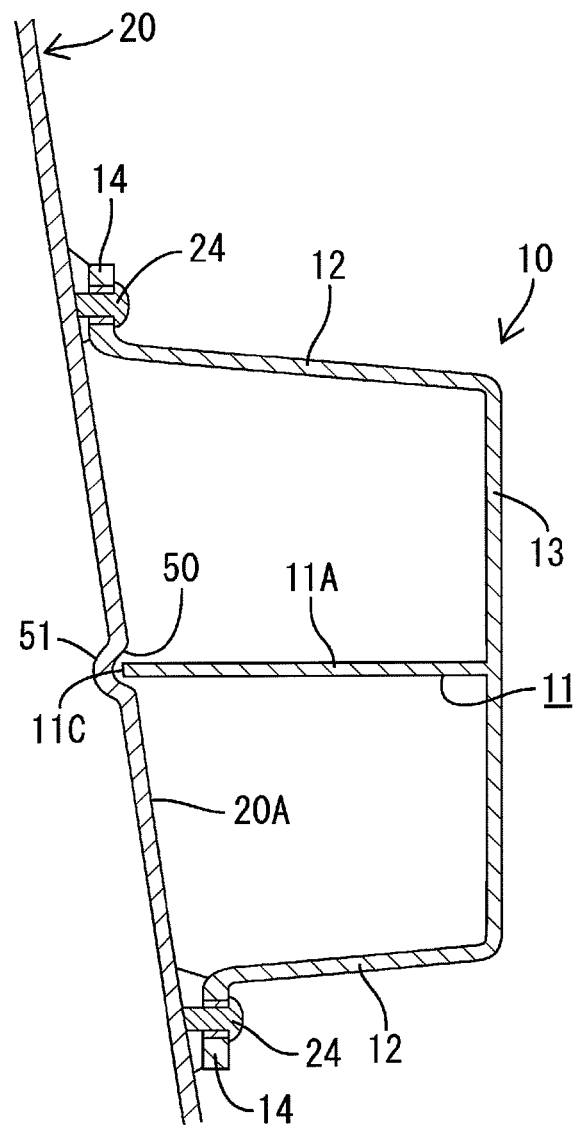
FIG. 12 is a cross-sectional view of a resin-made shock absorbing member mounting state according to a third illustrative aspect.

Hereinafter, by referring to FIG. 12, the third illustrative aspect of the present invention will be described. Unlike the rib-shaped collapse prevention ribs 25 and 40 of the first and second illustrative aspects, the movement restricting portion of the present illustrative aspect is configured as a recessed portion 50 as illustrated in FIG. 12. Meanwhile, the rib 11A is set substantially high enough to be fittable into the recessed portion 50. Therefore, when the resin-made shock absorbing member 10 is mounted on the mounting surface 20A of the door trim 20, the mutually facing edge 11C of the rib 11A is fit into the recessed portion 50 so as to restrict the rib 11A from moving relative to the mounting surface 20A of the door trim 20. This can simplify the configuration of the door trim 20. Note that this configuration requires the projecting portion 51 to be formed on an inner surface side of the door trim 20, which may damage design quality. In order to avoid this, a cover may be provided on the inner surface side of the door trim 20 to hide the projecting portion 51.

<Other illustrative aspects>

The present invention is not limited to the above description and the illustrative aspects described by referring to the drawings, but, for example, the following illustrative aspects are also included in the technical scope of the present invention.

(1) According to the above illustrative aspects, the mounting surface 20A of the door trim 20 is formed inclined with respect to the vertical direction and the input load direction is horizontal, but according to the present invention, the mounting surface may be formed vertically (e.g., the mounting surface 20B of FIG. 2), and the input load direction may be inclined with respect to the horizontal direction.

(2) According to the above illustrative aspects, the resin-made shock absorbing member 10 is mounted on the mounting surface 20A which is an inclined surface portion of the door trim 20, but according to the present invention, the resin-made shock absorbing member 10 may be mounted on a curved surface portion of the door trim 20.

(3) According to the above first and second illustrative aspects, the rib-shaped collapse prevention ribs 25 and 40 are exemplified as the movement restricting portion, but according to the present invention, a pin-shaped projecting portion may be used as the movement restricting portion.

What is claimed is:

1. A mounting structure between a door trim and a door panel for use in a vehicle, the mounting structure comprising:
a resin-made shock absorbing member including:
a cross-shaped rib including four ribs coupled into a cross shape and arranged perpendicular to the door trim, the cross-shaped rib having a coupling portion including ends of the four ribs coupled together in the cross shape;
an outer wall portion coupled to a side edge of at least one of the ribs such that a surface of the outer wall portion is perpendicular to the at least one of the ribs, the outer wall portion having a contact edge in contact with the door trim; and
a mounting bearing portion projecting from the contact edge of the outer wall portion along the door trim and configured to be fixed to the door trim together with the cross-shaped rib and the outer wall portion;
movement restricting members each including a pair of projections arranged opposite each other on the door trim with space therebetween in which corresponding one of the ribs is to be arranged when the shock absorbing member is fixed to the door trim at a normal position so as to restrict the ribs from moving relative to the door trim at side impact; and
support members each including a pair of projections arranged on the door trim, each projection is connected to a surface of corresponding one of the projections of the movement restricting members away from the corresponding one of the ribs so as to restrict the corresponding one of the projections of the movement restricting members from collapsing at the side impact.

2. The mounting structure according to claim 1, wherein:
the mounting bearing portion projects outward from the contact edge of the outer wall portion along the door trim; and
the outer wall portion includes a coupling rib coupling the outer wall portion with the mounting bearing portion.

3. The mounting structure according to claim 1, wherein the cross-shaped rib has a shape such that an opposed edge thereof to be opposed to the door trim is to be arranged separated from the door trim by a constant distance.

4. The mounting structure according to claim 1, wherein the outer wall portion has a shape with a width gradually decreasing from an outer compartment side toward the contact edge.

5. The mounting structure according to claim 1, wherein the shock absorbing member further includes reinforcing ribs connected to respective surfaces of the ribs of the cross-shaped rib.

6. The mounting structure according to claim 5, wherein each of the reinforcing ribs has a shape with a width gradually increasing from an opposed edge of the corresponding rib of the cross-shaped rib to an edge of the rib on an opposite side to the opposed edge, the opposed edge being to be opposed to the door trim.

7. The mounting structure according to claim 1, wherein the movement restricting members and the support members are integrally provided with the door trim.

8. A mounting structure between a door trim and a door panel for use in a vehicle, the mounting structure comprising:
a resin-made shock absorbing member including:
a cross-shaped rib including four ribs coupled into a cross shape and arranged perpendicular to the door trim, the cross-shaped rib having a coupling portion including ends of the four ribs coupled together in the cross shape;
an outer wall portion coupled to a side edge of at least one of the ribs such that a surface of the outer wall portion is perpendicular to the at least one of the ribs, the outer wall portion having a contact edge in contact with the door trim; and
a mounting bearing portion projecting from the contact edge of the outer wall portion along the door trim and to be fixed to the door trim together with the cross-shaped rib and the outer wall portion;
movement restricting members each including a pair of projections arranged opposite each other and perpendicular to corresponding one of the ribs of the cross-shaped rib on the door trim with space therebetween in which the corresponding one of the ribs of the cross-shaped rib is to be arranged when the shock absorbing member is fixed to the door trim at a normal position so as to restrict the ribs from moving relative to the door trim at side impact, and the corresponding one of the ribs of the cross-shaped rib is configured to interface with any one of the ribs of the movement restricting member when the shock absorbing member is positioned outside the normal position.

9. The mounting structure according to claim 8, further comprising support members each connected to a surface of corresponding one of the ribs of the movement restricting members away from corresponding one of the ribs of the cross-shaped rib so as to restrict the corresponding one of the ribs of the movement restricting members from collapsing at the side impact.

10. The mounting structure according to claim 8, wherein:
the mounting bearing portion projects outward from the contact edge of the outer wall portion along the door trim; and
the outer wall portion includes a coupling rib coupling the outer wall portion with the mounting bearing portion.

11. The mounting structure according to claim 8, wherein the cross-shaped rib has a shape such that an opposed edge thereof to be opposed to the door trim is to be arranged separated from the door trim by a constant distance.

12. The mounting structure according to claim 8, wherein the outer wall portion has a shape with a width gradually decreasing from an outer compartment side toward the contact edge.

13. The mounting structure according to claim 8, wherein the shock absorbing member further includes reinforcing ribs connected to respective surfaces of the ribs of the cross-shaped rib.

14. The mounting structure according to claim 13, wherein each of the reinforcing ribs has a shape with a width gradually increasing from an opposed edge of the corresponding rib of the cross-shaped rib to an edge of the rib on an opposite side to the opposed edge, the opposed edge being to be opposed to the door trim.

15. The mounting structure according to claim 9, wherein the movement restricting members and the support members are integrally provided with the door trim.

* * * * *

UNITED STATES PATENT AND TRADEMARK OFFICE
CERTIFICATE OF CORRECTION

PATENT NO.         : 8,215,699 B2
APPLICATION NO.    : 12/756234
DATED              : July 10, 2012
INVENTOR(S)        : T. Suzuki et al.

Page 1 of 1

It is certified that error appears in the above-identified patent and that said Letters Patent is hereby corrected as shown below:

At column 8, line 17 (claim 6, line 5), please change "the opposed edge being to be opposed to" to -- the opposed edge being opposed to --.

At column 10, line 5 (claim 14, line 5), please change "the opposed edge being to be opposed to" to -- the opposed edge being opposed to --.

Signed and Sealed this
Twelfth Day of February, 2013

Teresa Stanek Rea
*Acting Director of the United States Patent and Trademark Office*